US012577902B1

(12) United States Patent
Shah et al.

(10) Patent No.: US 12,577,902 B1
(45) Date of Patent: Mar. 17, 2026

(54) ELECTRICALLY ASSISTED PRE-CHAMBER IGNITION SYSTEM

(71) Applicant: SAUDI ARABIAN OIL COMPANY, Dhahran (SA)

(72) Inventors: Ashish Dinesh Shah, Canon, MI (US); Rafael Lago Sari, Commerce Township, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/888,312

(22) Filed: Sep. 18, 2024

(51) Int. Cl.
*F02B 19/12* (2006.01)
*F02P 3/04* (2006.01)
*F02P 3/08* (2006.01)

(52) U.S. Cl.
CPC ................ *F02B 19/12* (2013.01); *F02P 3/04* (2013.01); *F02P 3/08* (2013.01)

(58) Field of Classification Search
CPC .. F02B 19/12; F02B 19/1004; F02B 19/1019; F02B 2019/006; F02P 3/04; F02P 3/08
See application file for complete search history.

(56) References Cited

U.S. PATENT DOCUMENTS 7,659,655 B2 2/2010 Tozzi et al.
9,004,042 B2 * 4/2015 Tozzi ...................... H01T 13/54 123/297
10,054,100 B2 8/2018 Minami
10,770,868 B1 * 9/2020 Gozawa .................. H01T 13/20
11,183,818 B2 * 11/2021 Niessner ................. H01T 13/06
11,509,120 B2 11/2022 Woo
(Continued)

FOREIGN PATENT DOCUMENTS

DE 102019125479 A1 * 5/2020 .............. F02B 19/18
DE 102019122531 A1 * 2/2021 .............. F02B 19/12
(Continued)

OTHER PUBLICATIONS

J. Fang, et al., "Effects of Electric Fields on the Combustion Characteristics of Lean Burn Methane-Air Mixtures," Energies, 2015 (19 pages).
(Continued)

*Primary Examiner* — Grant Moubry
(74) *Attorney, Agent, or Firm* — Osha Bergman Watanabe & Burton LLP

(57) ABSTRACT

A prechamber device for facilitating a combustion reaction within a combustion chamber of an internal combustion spark-ignition gasoline engine includes a prechamber body, first and second electrodes, an insulation, first and second electrode terminals, a spark plug, and a prechamber head. The prechamber body includes orifices and at least partially contains the combustion reaction. The insulation insulates the first electrode and the second electrode from the prechamber body. The first electrode terminal receives a first amount of power and the second electrode terminal receives a second amount of power from an energy storage device. The first and second electrode terminals deliver the power to the first electrode and the second electrode that generate the electric field. The spark plug generates an ignition arc to initiate the combustion reaction. The prechamber head retains a position of the spark plug and closes off a first end of the prechamber body.

20 Claims, 5 Drawing Sheets

(56) References Cited

U.S. PATENT DOCUMENTS

| | | | | |
|---|---|---|---|---|
| 2014/0076274 | A1 | 3/2014 | Tozzi et al. | |
| 2022/0220921 | A1 * | 7/2022 | Engineer .................. | F02B 3/06 |

FOREIGN PATENT DOCUMENTS

| | | | | |
|---|---|---|---|---|
| DE | 102021102084 | A1 | 8/2022 | |
| DE | 102023135893 | A1 * | 7/2024 | ............. F02B 19/12 |

OTHER PUBLICATIONS

X. Meng, et al., "Effects of Direct-Current (DC) Electric Fields on Flame Propagation and Combustion Characteristics of Premixed CH4/O2/N2 Flames," Energy & Fuel, 2012 (9 pages).
S. Dev, et al., "Ion Current Measurement of Diluted CombustionUsing a Multi-Electrode Spark Plug," SAE Technical Paper 2018-01-1134, 2018 (14 pages).

* cited by examiner

ELECTRICALLY ASSISTED PRE-CHAMBER IGNITION SYSTEM

BACKGROUND

Internal combustion engines generally operate by combusting an air-fuel mixture within a combustion chamber, where the combustion of the air-fuel mixture forces movement of pistons and a crankshaft within the engine. A typical internal combustion engine includes multiple cylinders defining the combustion chambers within an engine block. In some situations, a fuel mixture is directed through an inlet valve into the cylinder and subsequently ignited to generate a combustion reaction.

Combustion within a combustion chamber of an internal combustion engine may be generated using different mechanisms, such as using high pressure and/or high temperature conditions or using an ignition device. A common ignition device set up requires an ignition source, or spark, to be produced such that combustion is created by sparking an air-fuel mixture in the combustion chamber of the engine. Alternatively, a portion of the air-fuel mixture may be ignited in a pre-combustion chamber (also referred to as a prechamber), where the air-fuel mixture is ignited, and the resulting combustion reaction is released into the main combustion chamber to ignite the remainder of the air-fuel mixture.

Pre-chambers are used to combust a small quantity of fuel and produce turbulent jets, which can be ejected into the main combustion chamber to initiate combustion of the air-fuel mixture within the main combustion chamber. The turbulent jets provide distributed ignition sites that enable high burn rates of the air-fuel mixture in the main combustion chamber. Pre-chamber combustion can improve engine efficiency and reduce emission by providing fast combustion, better dilution tolerance, and lower knock tendency.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A prechamber device includes a prechamber body, a first electrode and a second electrode, an insulation, a first electrode terminal and a second electrode terminal, a spark plug, and a prechamber head. The prechamber body includes orifices and at least partially contains a combustion reaction. The first electrode and the second electrode generate an electric field inside the prechamber device. The insulation insulates the first electrode and the second electrode from the prechamber body. The first electrode terminal receives a first amount of power from an energy storage device, and the second electrode terminal receives a second amount of power from the energy storage device. The first and second electrode terminals deliver the first and second power amounts to the first electrode and the second electrode that generate the electric field. The spark plug generates an ignition arc to initiate the combustion reaction. The prechamber head retains a position of the spark plug and closes off a first end of the prechamber body.

An engine includes a combustion chamber, a piston, a fuel injector, a prechamber device, and an electronic control unit (ECU). The combustion chamber forms a containment boundary for a combustion reaction. The piston is actuated by the combustion reaction. The fuel injector injects fuel into the combustion chamber. The prechamber device includes a prechamber body, a first electrode and a second electrode, an insulation, a first electrode terminal and a second electrode terminal, a spark plug, and a prechamber head. The prechamber body includes orifices and at least partially contains a combustion reaction. The first electrode terminal receives a first amount of power from an energy storage device, and the second electrode terminal receives a second amount of power from the energy storage device. The first and second electrode terminals deliver the first and second power amounts to the first electrode and the second electrode that generate the electric field. The spark plug generates an ignition arc to initiate the combustion reaction. The prechamber head retains a position of the spark plug and closes off a first end of the prechamber body. The ECU controls a strength and timing of the electric field between the first electrode and the second electrode.

A method includes retaining a position of a spark plug with a prechamber head, where the prechamber head closes off a first end of a prechamber body comprising a plurality of orifices. The method also includes insulating a first electrode and a second electrode from the prechamber body with an insulation. The first electrode terminal receives a first amount of power from an energy storage device, and the second electrode terminal receives a second amount of power from the energy storage device. An electric field is generated within a prechamber device comprising the prechamber head and the prechamber body by way of the first electrode and the second electrode. An ignition arc is generated with a spark plug, which initiates a combustion reaction. The combustion reaction is contained at least partially in the prechamber body.

Other aspects and advantages of the claimed subject matter will be apparent from the following description and appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element in a prechamber device as described herein. In addition, the term "axial" refers to an orientation substantially parallel to an extension direction of the prechamber device, while the term "radial" denotes a direction orthogonal to an axial direction. Similarly, the terms "vertical" and "vertically" refer to an axial direction (i.e., the primary extension direction of the prechamber device) while the terms "lateral" and "laterally" refer to the radial direction orthogonal to a vertical direction.

In general, one or more embodiments of the present invention are directed toward a device, a system, and a method for facilitating a combustion reaction within a combustion chamber of an internal combustion spark-ignition gasoline engine. The combustion reaction is facilitated by a prechamber device that incorporates a prechamber with integrated components to generate an electric field in order to promote ignition and early combustion behavior inside the prechamber. By controlling the electric field generated within the prechamber of the prechamber device, the proposed design increases lean tolerance and dilution tolerance of the engine without the need for auxiliary fueling inside the prechamber.

Figure 1:
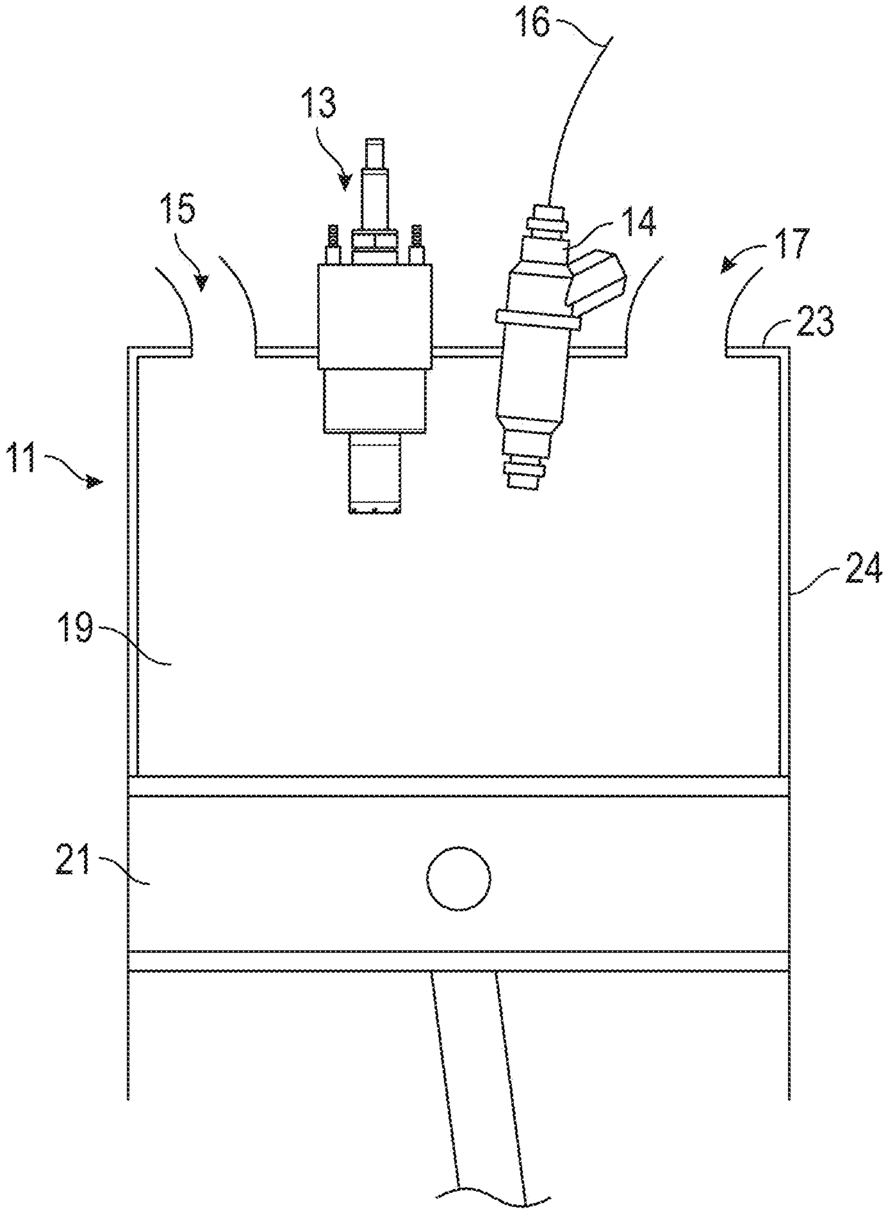
FIG. 1 depicts an engine in accordance with one or more embodiments disclosed herein.

FIG. 1 shows a diagram of an engine assembly including an engine 11 in accordance with one or more embodiments of the invention. In general, engines 11 are configured in a myriad of ways. Therefore, the engine 11 is not intended to limit the particular configuration of the system. For example, the engine 11 is depicted as having an intake valve 15, an exhaust valve 17, a prechamber device 13, a fuel injector 14, a wiring harness 16, a combustion chamber 19, a piston 21, a cylinder head 23, and an upper block 24. In one or more embodiments, the prechamber device 13 may be applicable to an internal combustion spark-ignition gasoline engine 11 which combusts an air-fuel mixture with a spark from a spark plug (e.g., FIGS. 2A and 2B).

As shown in FIG. 1, the engine 11 includes a cylinder head 23, formed of aluminum or cast iron, that delimits the combustion chamber 19 in conjunction with the piston 21. In addition, the cylinder head 23 provides support for attaching various components that are in fluid communication with the combustion chamber 19.

Specifically, the intake valve 15, exhaust valve 17, prechamber device 13, and fuel injector 14 are fixed (i.e., bolted or threaded) in or on the cylinder head 23 such that these devices are in fluid communication with the combustion chamber 19. The cylinder head 23 is disposed above the upper block 24, and the combustion chamber 19 is contained within a space formed by the upper block 24 sealed by the cylinder head 23. The cylinder head 23 and the upper block 24 may be separated by a gasket (not shown) in one or more embodiments without departing from the nature of this disclosure.

The intake valve 15 and exhaust valve 17 are configured to facilitate the introduction and removal of gases from the combustion chamber 19. In particular, the intake valve 15 is configured to allow air to enter the combustion chamber 19 prior to a combustion reaction, and the combustion chamber 19 is configured to form a containment boundary for the combustion reaction. Conversely, the exhaust valve 17 is configured to allow the combusted air-fuel mixture to exit the combustion chamber 19 following the combustion reaction. The intake valve 15 and the exhaust valve 17 may be formed of cast iron or aluminum, and may be bolted, welded, or otherwise rigidly fixed to the cylinder head 23.

Figure 3:
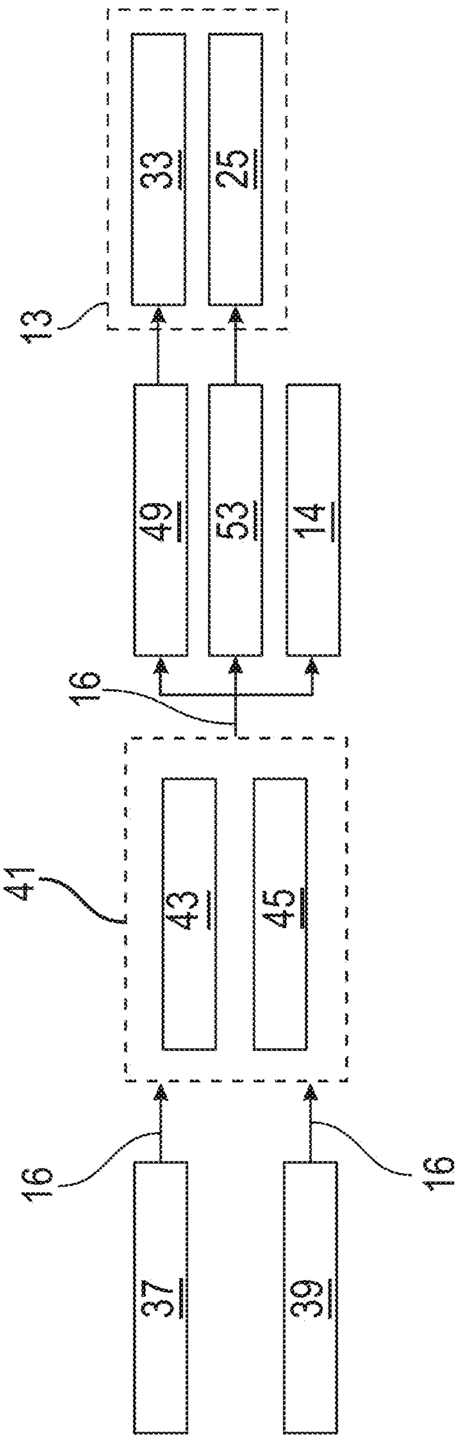
FIG. 3 depicts a block diagram of the electronic components associated with the prechamber device in accordance with one or more embodiments disclosed herein.

The fuel injector 14 may be formed of metal such as carburized steel or titanium and is configured to inject fuel through a fuel nozzle (not shown) into the combustion chamber 19 according to signals from an engine control unit (ECU) (e.g., FIG. 3). The ECU sends signals to the fuel injector 14 via a wiring harness 16. The injected fuel is then mixed with air from the intake valve 15 to create an air-fuel mixture. In addition, the ECU is further configured to control a strength of an electric field generated within the prechamber device 13, which is described in greater detail below.

As described below, the prechamber device 13 is formed from a plurality of components and materials, and aids in the combustion reaction of the air-fuel mixture by increasing the temperature of the air-fuel mixture. This air-fuel mixture is then ignited to actuate the piston 21, therefore expanding the combustion chamber 19 and generating work.

In accordance with one or more embodiments of the invention, in order to create a spark ignition combustion reaction in the spark ignition mode, the engine 11 may operate in a four stroke process including an intake phase, a compression phase, a combustion phase, a power phase, and an exhaust phase. However, it will be appreciated to a person having ordinary skill in the art that the engine 11 is not limited to a four stroke engine, and may vary according to a manufacturer's or operator's discretion. Initially, during the intake phase of an engine cycle a piston 21 of the engine 11 is actuated. The resulting vacuum created by the piston 21 draws air into the combustion chamber 19 from the intake valve 15, while fuel is simultaneously injected through the fuel injector 14. The intermixing of the air and fuel creates an air-fuel mixture to be ignited during the combustion phase.

During the compression phase, the piston 21 reaches its lowest point (hereinafter "BDC" or bottom dead center) and the piston 21 actuates to compress the air-fuel mixture in the combustion chamber 19. In the combustion phase, the piston 21 reaches its highest point (hereinafter "TDC" or top dead center), and a spark plug (e.g., FIG. 2A) of the prechamber device 13 creates a spark that ignites the compressed air-fuel mixture. During the power phase the expansion of the air-fuel mixture throughout the combustion chamber 19 thrusts the piston 21 downward and creates work that is translated to an output shaft (not shown) of the engine 11. During the exhaust phase, the piston 21 actuates from BDC to TDC, forcing exhaust gases out of the exhaust valve 17. At this point, the piston 21 is at TDC and the cycle restarts with the intake phase.

Figure 2B:
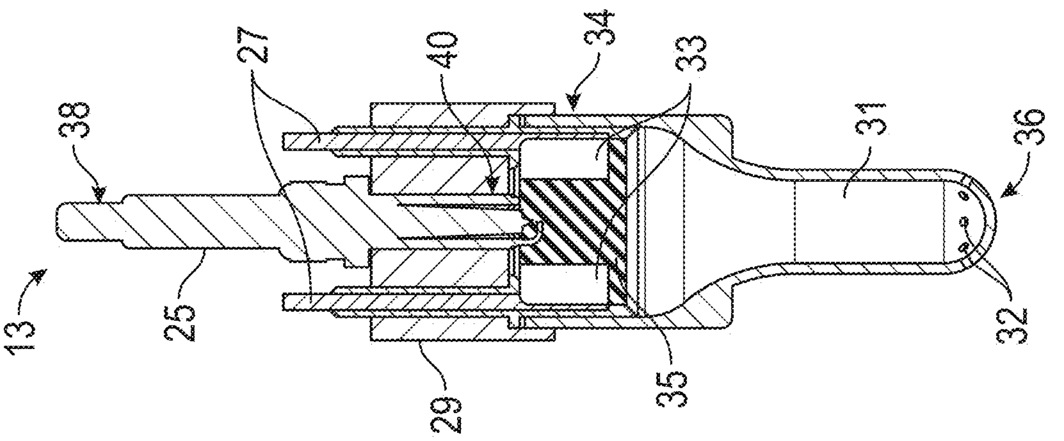
FIGS. 2A and 2B depict a prechamber device from different views in accordance with one or more embodiments disclosed herein.
Figure 2A:
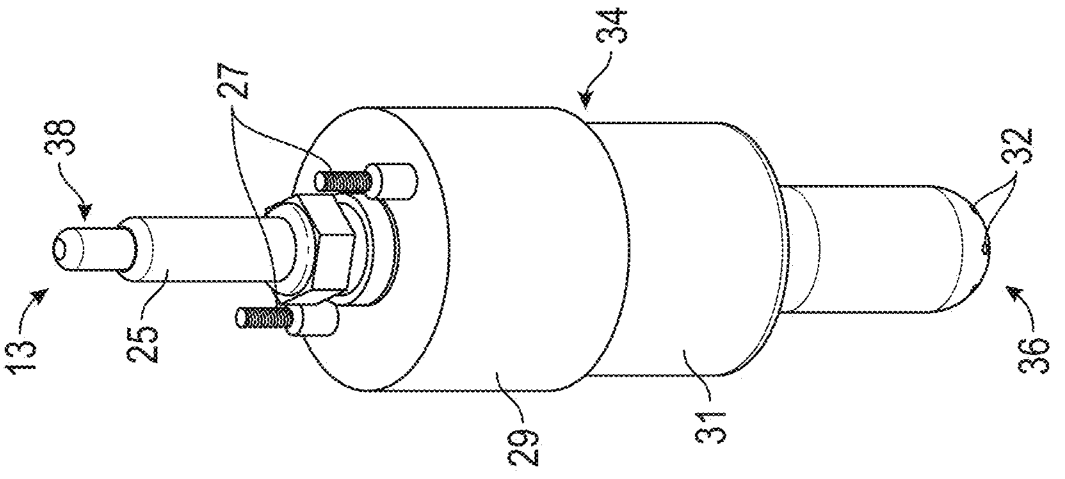

Turning to FIGS. 2A and 2B, FIG. 2A depicts an exterior view of the prechamber device 13 in accordance with one or more embodiments of the invention. The prechamber device 13 comprises a spark plug 25, a first electrode terminal 27 and a second electrode terminal 27, a prechamber head 29, and a prechamber body 31. The prechamber device 13 is configured to generate an electric field in order to promote ignition and early combustion behavior inside the prechamber body 31. Specifically, and as described further below, the ignition inside the prechamber body 31 causes heat to be released, leading to the formation of turbulent jets, thus igniting the air-fuel mixture in the combustion chamber 19.

The prechamber head 29 and the prechamber body 31 are formed with a diameter extending in a radial direction, orthogonal to an axial direction. The prechamber body 31 comprises a first end 34 and a second end 36, where a diameter of the first end 34 of the prechamber body 31 is greater than a diameter of the second end 36 of the prechamber body 31. The prechamber head 29 is configured to retain a position of the spark plug 25 (i.e., secure the spark plug 25 via mating of corresponding threaded portions of the spark plug 25 and the prechamber head 29 such that the spark plug 25 is unable to move in any direction) and close off the first end 34 of the prechamber body 31, while the second end 36 of the prechamber body 31 comprises a plurality of orifices 32 directed toward the combustion chamber 19. Further, the second end 36 is opposite that of the first end 34 and extends away from the prechamber head 29. The prechamber device 13 is attached the cylinder head 23 utilizing external threads (not shown) on the exterior of the prechamber device 13, such that the prechamber body 31 protrudes into the combustion chamber 19. Specifically, the prechamber head 29 comprises threads (not shown) on an external curved face, while the cylinder head 23 comprises an opening with corresponding threads for the prechamber head 29.

The plurality of orifices 32 facilitate the ejection of combusted air-fuel mixture as turbulent jets from within the prechamber body 31 into the combustion chamber 19. The turbulent jets provide distributed ignition sites that enable high burn rates of the air-fuel mixture in the combustion chamber 19 and increase the overall efficiency of the engine 11. Specifically, the plurality of orifices 32 are distributed uniformly in a radial pattern on the second end 36 of the prechamber body 31. In accordance with one or more embodiments of the invention, the plurality of orifices 32 are typically of a circular shape, and may typically comprise between four to ten individual orifices that may range from 0.5 millimeters to 2.0 millimeters in diameter. However, it will be appreciated to a person having ordinary skill in the art that the shape, number, and size of the plurality of orifices 32 may vary according to a manufacturer's or operator's discretion.

The spark plug 25 and the electrode terminals 27 extend axially through the prechamber head 29. The prechamber head 29 rests outside of the cylinder head 23, and the spark plug 25 and electrode terminals 27 are partially exposed. In this way, the spark plug 25 may comprise a threaded portion (not shown) that mates with a corresponding threaded portion (not shown) disposed inside the prechamber head 29 extending in the axial direction from a flat surface of the prechamber head 29. The spark plug 25 may thus be inserted and/or removed from the prechamber head 29. When assembled, the spark plug 25 extends through the prechamber head 29 such that a first end 38 of the spark plug 25 is exposed to an external environment and a second end (e.g., FIG. 2B) of the spark plug 25 extends through the prechamber head 29 into the prechamber body 31. In addition, the second end of the spark plug 25 includes sparking electrodes configured to create a spark.

In addition, the electrode terminals 27 may connect to an ECU and an energy storage device (e.g., FIG. 3) in order for the electrodes 33 to receive power. In accordance with one or more embodiments of the invention, the electrode terminals 27 may be positioned on opposite sides of the prechamber head 29, and may be disposed about the spark plug 25 in a radial direction such that the spark plug 25 is centrally located in relation to the electrode terminals 27. However, the electrodes 33 and electrode terminals 27 may be arranged in a different manner in alternative embodiments not shown, depending on the shape of the prechamber device 13, the location of the spark plug 25, and/or the anticipated location of flame propagation, such that an electric field may be generated in order to assist flame kernel growth and expansion. Similarly, the spark plug 25 may be connected to the ECU such that the ECU determines and controls the timing of the operation of the spark plug 25. For its part, the spark plug 25 generates an ignition arc in order to initiate the combustion reaction inside the prechamber body 31. Similarly, the ECU controls the timing and amount of power supplied to the electrode terminals 27. Further, the ECU is connected to an energy storage device that may comprise an inductive device (i.e., inductor), and/or a capacitive device (i.e., capacitor).

The ECU may comprise a memory (e.g., FIG. 3,) and a central processing unit (CPU) (e.g., FIG. 3). The memory may comprise a non-transient storage medium including instructions configured to control the strength of a generated electric field in the prechamber body 31, as well as control the timing of the spark plug 25 and the fuel injector 14. The ECU is discussed further below in relation to FIG. 3.

Turning to FIG. 2B, FIG. 2B shows an internal cut-view of the prechamber device 13. The prechamber body 31 comprises at least two electrodes 33, and an insulation 35. The cut-view of the prechamber device 13 further shows that the spark plug 25 and the electrode terminals 27 extend axially from the prechamber body 31 and through the prechamber head 29, with the first end 38 of the spark plug 25 outside of the prechamber head 29 exposed to an external environment and the second end 40 of the spark plug extending through the prechamber head 29 into the prechamber body 31. Further, it is shown in FIG. 2B that each electrode 33 is connected to an associated electrode terminal 27. The electrode terminals 27 receive power from an energy storage device comprising a capacitor and/or inductor, and supply power to each associated electrode 33. The potential difference created by the electrodes is less than or equal to 40 kV, inclusive. For example, if the first electrode terminal 27 receives a voltage of 10 kV, the second electrode terminal 27 receives a voltage up to 50 kV, inclusive, such that the potential difference created by the electrodes 33 equals 40 kV. The ECU controls the timing and amount of power supplied from the energy storage device to the electrode terminals 27.

The at least two electrodes 33 are disposed within the prechamber body 31 and the electrodes 33 are insulated from the prechamber body 31 by the insulation 35. The insulation 35 may be formed of ceramic or a similar electrically insulating material. The at least two electrodes 33 may comprise a pin, a plate, or a cylinder type of electrode.

Turning to FIG. 3, FIG. 3 shows a block diagram of an electronic control unit (ECU) 41 and connected components. The ECU 41 comprises a central processing unit (CPU) 43 and a memory 45. Further, the ECU 41 receives power from a battery 39, and the ECU 41 receives data relating to the temperature of the engine 11 (i.e., engine coolant temperature) from a temperature sensor 37. The ECU 41 controls the timing of the fuel injector 14 and the prechamber device 13. The electrodes 33 of the prechamber device 13 are connected to an energy storage device 49 in order to receive power therefrom, and the ECU 41 is connected to the energy storage device 49 in order to control the strength and timing of the power supplied to the electrodes 33. By controlling the energy storage device 49, the ECU 41 therefore controls the strength and timing of the electric field generated between the electrodes 33. The components listed above are connected by way of a wiring harness 16, which includes wires and/or a printed circuit board to form electrical pathways between the aforementioned components.

The CPU 43 of the ECU 41 is formed by one or more processors, integrated circuits, microprocessors, or equivalent computing structures that serve to execute computer readable instructions stored on the memory 45. The memory 45 of the ECU 41 includes a non-transitory storage medium such as flash memory, a Hard Disk Drive (HDD), a solid state drive (SSD), a combination thereof, or equivalent storage devices. In relation to the invention as described herein, the memory 45 stores computer readable instructions, executed by the CPU 43, that relate to controlling the prechamber device 13 to facilitate a combustion reaction in the engine 11.

Typically, the battery 39 is configured to provide power to the ECU 41, and the ECU 41 is configured to control an energy storage device 49 configured to transmit power to the at least two electrodes 33, which generate an electric field with a voltage difference of less than or equal to 40 kilovolts (kV). Specifically, the first electrode terminal 27 receives a first amount of power from an energy storage device 49, and the second electrode terminal 27 receives a second amount of power from the energy storage device 49. The first and second electrode terminals 27 deliver the first and second power amounts to the first electrode 33 and the second electrode 33 that generate the electric field. The energy storage device 49 may comprise at least one of a capacitor and/or an inductor.

For instance, the prechamber device 13 is typically used for cold start conditions and/or operating conditions determined by a manufacturer. Cold start conditions for an engine 11 occur when the engine 11 has been at rest for a prolonged period, typically resulting in an engine 11 being at an ambient temperature rather than at optimal operating temperatures. In this way, the prechamber device 13, which produces turbulent jets in order to promote ignition of the air-fuel mixture in the combustion chamber 19, may be helpful in assisting the engine 11 in reaching optimal operating temperatures. A temperature sensor 37 measures the temperature of coolant in the engine 11 in order to determine the temperature of the engine 11. The temperature of the engine 11 is relayed to the ECU 41, and if the temperature is below a manufacturer defined operating temperature threshold, the ECU 41 may control the prechamber device 13 to operate until the temperature threshold is achieved. On the other hand, in instances other than cold start conditions and/or operating conditions determined by the manufacturer, the ECU 41 may determine from the temperature of the engine 11 collected from the temperature sensor 37 that the prechamber device 13 may not be necessary for that time and may prevent the supply of power from the energy storage device 49 to the at least two electrodes 33.

In either operating case, the ECU 41 will continue to instruct the spark plug 25 to create an ignition arc that initiates the combustion reaction. The spark plug 25 receives power from an ignition coil 53, which is connected to and powered by the battery 39. During operation, the ignition coil 53 transforms voltage received from the battery 39 to a higher voltage required for spark generation. The ignition coil 53 may be formed, for example, as an iron core surrounded by electrically charged copper wires. The spark plug 25 includes a center electrode formed of copper, nickel-iron, or noble metals, that generates a spark across an air gap in conjunction with a side electrode formed from copper. The resulting spark created by the spark plug 25 is propagated as a flame jet (alternatively described as a "flame front" or a "turbulent jet" herein) throughout the combustion chamber 19, which drives the combustion reaction.

Figure 4:
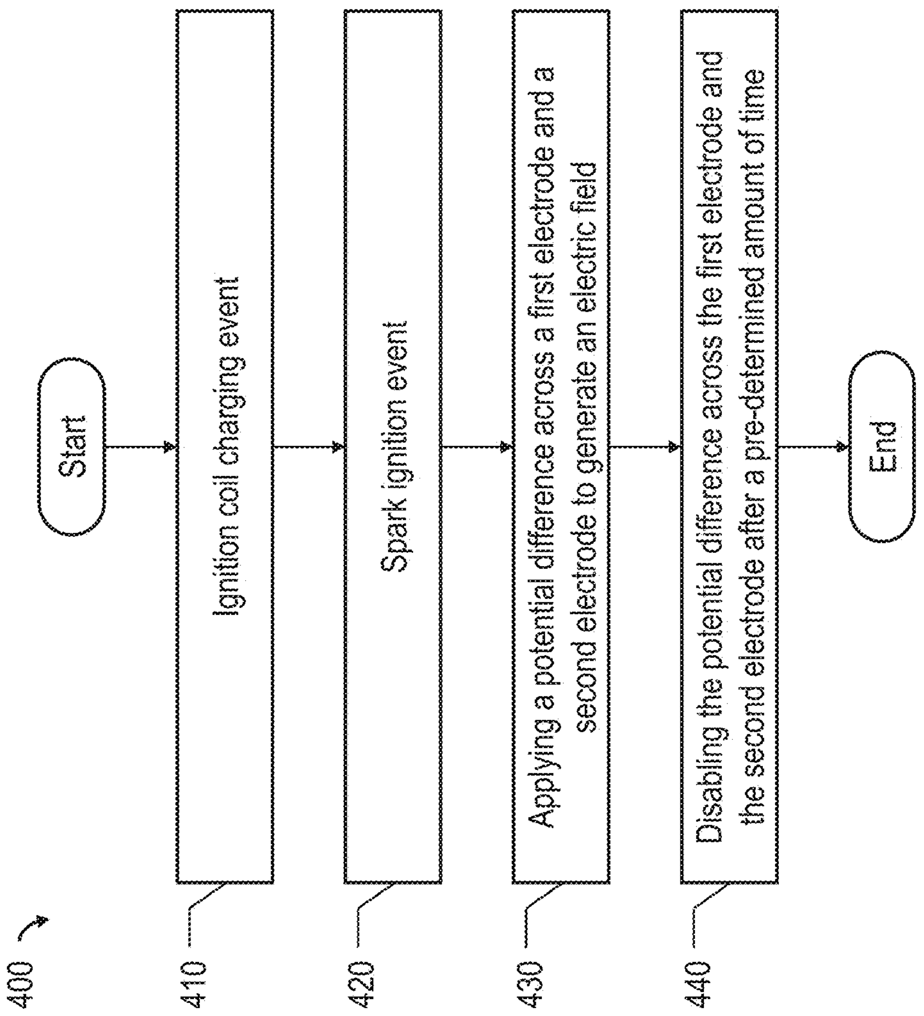
FIG. 4 shows a flowchart of a process for operating the electrically assisted prechamber ignition system in accordance with one or more embodiments disclosed herein.

Turning to FIG. 4, FIG. 4 depicts a method 400 for the operating principle of the prechamber device 13. While the various blocks in FIG. 4 are presented and described sequentially, one of ordinary skill in the art will appreciate that some or all of the blocks may be executed in a different order, may be combined or omitted, and some or all of the blocks may be executed in parallel and/or iteratively. The blocks may encompass multiple actions and/or multiple blocks may be performed in the same physical action. Furthermore, the blocks may be performed actively or passively.

The method of FIG. 4 initiates with Step 410, which includes an ignition coil charging event. The ignition coil charging event comprises applying electric current to an ignition coil 53 until the electric current reaches a maximum amperage. As the ignition coil 53 is charging, a magnetic field is generated by the ignition coil 53 until the magnetic field is stable and reaches a maximum strength. Typically, the charging event may last from 1.5 milliseconds to 4 milliseconds. The magnetic field allows the ignition coil 53 to store electric energy, which may be used to create a spark for a spark plug 25. Alternatively, a capacitive discharge system may be used in place of the ignition coil charging event. A capacitive discharge system comprises an internal transformer that steps up voltage received from the battery 39 and stores the increased voltage in a capacitor that may deliver the stored voltage to the spark plug 25 at any time. Step 410 may occur during the compression phase, as the air-fuel mixture is compressed in the combustion chamber 19 and prechamber body 31.

Step 420 includes a spark ignition event. The regular spark ignition event comprises interrupting the electrical current present in a primary winding of the ignition coil 53, thus causing the generated magnetic field to collapse, therefore inducing a high voltage in a secondary winding of the ignition coil 53. The ECU 41 controls the timing for when to interrupt the current flow through the primary winding of the ignition coil 53, and the high voltage is delivered to the spark plug 25. In the case of a capacitive discharge system, the ECU 41 controls the timing for when to deliver the stored voltage in the capacitor to the spark plug 25.

Continuing with Step 420, the spark ignition event further comprises discharging the high voltage through the spark plug 25 in the form of an ignition arc. The high voltage delivered to the spark plug 25 from the ignition coil 53 is used to create a potential difference across a spark plug gap in the spark plug 25. In accordance with one or more embodiments of the invention, the spark plug 25 may be configured with a spark plug gap size ranging from 0.028 inches to 0.060 inches, inclusive. However, it will be appreciated to a person having ordinary skill in the art that the spark plug gap size may vary according to a manufacturer's or operator's discretion. The voltage in the spark plug 25 is high enough to ionize the air-fuel mixture in the spark plug gap, which causes electrons to jump across the spark plug gap, thus creating a spark, or an ignition arc. Finally, the ignition arc from the spark plug 25 ignites and combusts the air-fuel mixture present in the prechamber body 31, initiating the start of the combustion phase.

Step 430 includes an electrical assistance event. During and/or towards the end of the spark ignition event (i.e., Step 420), power is supplied to the first electrode 33 and the second electrode 33 of the at least two electrodes 33. The first electrode 33 and the second electrode 33 are disposed within the prechamber body 31, and the difference in voltage supplied to the first electrode 33 and the second electrode 33 generates an electric field with a strength of up to 40 kV, inclusive, within the prechamber body 31. The power is supplied from an energy storage device 49 controlled by the ECU 41.

The generated electric field within the prechamber body 31 induces the "ionic wind" effect. The ionic wind effect is a known phenomenon wherein an electric field promotes the rate of combustion by modifying the behaviors of charged particles (i.e., radical ions and electrons) produced during combustion. Specifically, the electric field ionizes fuel molecules, creating positive and negative ions. These ions are then accelerated by the electric field, generating a flow of ions known as ionic wind. The ionic wind enhances the mixing of the air and fuel, leading to a more uniform distribution of reactants, thereby promoting a more efficient and complete combustion process.

When the spark plug 25 generates the ignition arc in the prechamber body 31, the air-fuel mixture combusts, and the ionic wind effect may significantly increase (i.e., greater than 25%) the speed of the turbulent jets ejected from the prechamber body 31 into the combustion chamber 19. In turn, the increased combustion rate facilitates a more thorough combustion reaction, leading to the generation of fewer emissions residuals due to an incomplete or lengthy combustion process.

Step 440 includes disabling the potential difference applied across the first electrode 33 and the second electrode 33 such that combustion may proceed normally in the combustion chamber 19. The ECU 41 selectively actuates to partition a portion of the power provided to the prechamber device 13. The ECU 41 determines the amount of voltage supplied to the prechamber device 13 and controls the duty cycle of the electrodes 33, such that the ECU 41 may prevent the supply of power to the electrodes 33 after a predetermined amount of time, corresponding to the combustion phase of the engine 11.

Figure 5:
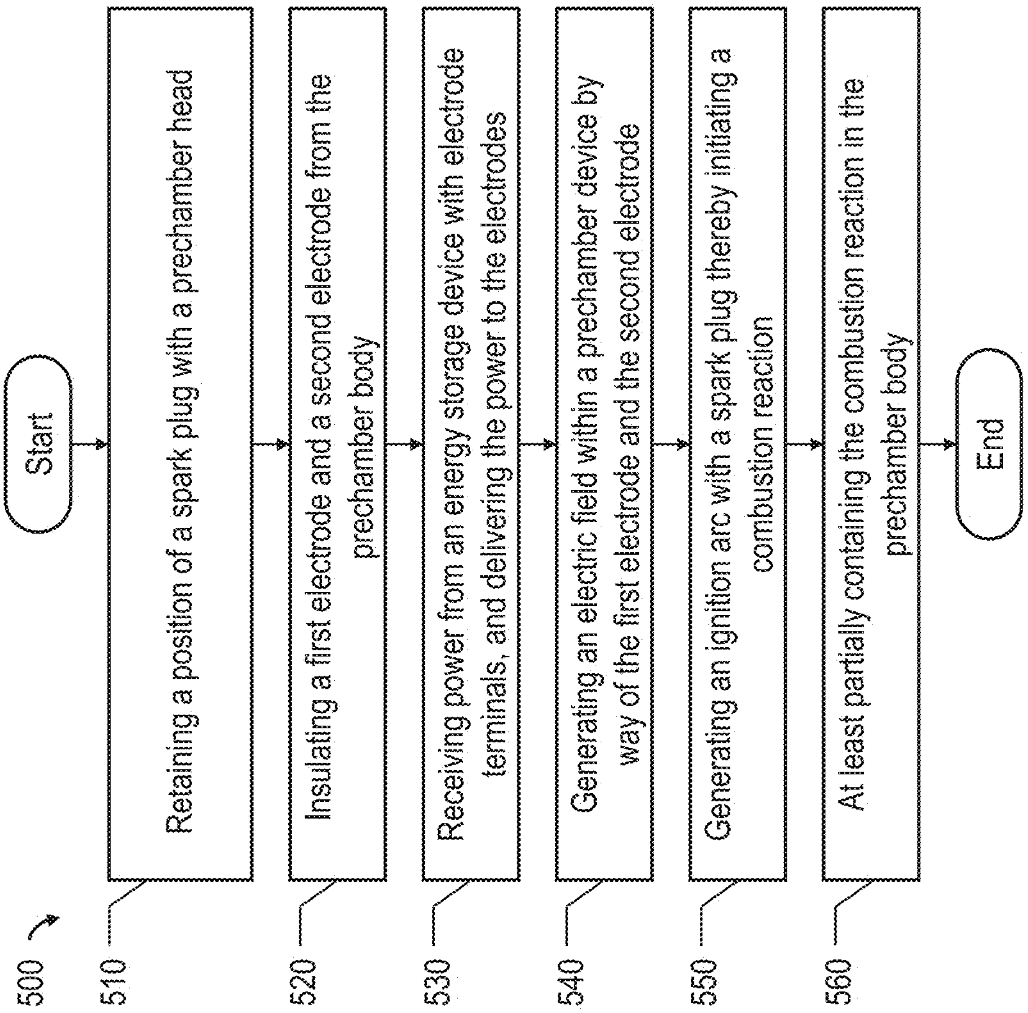
FIG. 5 depicts a flowchart of a process for the prechamber device in accordance with one or more embodiments disclosed herein.

Turning to FIG. 5, FIG. 5 depicts a method 500 for the prechamber device 13 in accordance with one or more embodiments of the invention. While the various blocks in FIG. 5 are presented and described sequentially, one of ordinary skill in the art will appreciate that some or all of the blocks may be executed in parallel and/or iteratively. The blocks may encompass multiple actions and/or multiple blocks may be performed in the same physical action. Furthermore, the blocks may be performed actively or passively.

The method of FIG. 5 initiates with Step 510, which includes retaining a position of a spark plug 25 with a prechamber head 29, where the prechamber head 29 closes off a first end 34 of a prechamber body 31. The prechamber body 31 comprises a first end 34 and a second end 36, where the first end 34 of the prechamber body 31 is closed off by a prechamber head 29, and the second end 36 of the prechamber body 31 comprises the plurality of orifices 32. The prechamber device 13 may be threaded or bolted into the cylinder head 23 of the engine 11 such that the prechamber body 31 protrudes into the combustion chamber 19 up to the prechamber head 29. Accordingly, the plurality of orifices 32 are directed toward the inside of the combustion chamber 19, and the second end 36 of the prechamber body 31 extends axially into the combustion chamber 19.

The prechamber body 31 further comprises at least two electrodes 33, and the electrodes 33 are each connected to an associated electrode terminal 27. The electrode terminals 27 are connected to an energy storage device 49, in order for the electrodes 33 to receive power, and the energy storage device 49 is connected to an electronic control unit (ECU) configured to control the timing and strength of the power supplied to the electrodes 33. The interconnection is embodied by a wiring harness 16 that interconnects the electrodes 33 to the energy storage device 49 and the ECU 41.

Step 520 includes insulating the first electrode 33 and the second electrode 33 from the prechamber body 31 with an insulation 35. As discussed further below, the first electrode 33 and the second electrode 33 generate an electric field, and the generated electric field promotes combustion inside the prechamber body 31 by way of the ionic wind effect. The insulation 35 insulating the electrodes 33 from the prechamber body 31 prevents the electrodes 33 from short circuiting, ensures a uniform and predictable electric field is generated, avoids electrical shocks when in contact with the prechamber body 31, and protects the prechamber body 31 from possible damage due to a high voltage or current.

Step 530 includes supplying a potential difference from an energy storage device 49 to a first electrode 33 and a second electrode 33 of the at least two electrodes 33. The energy storage device 49 is configured to provide power to a first electrode terminal 27 and a second terminal 27, which deliver power to the first electrode 33 and the second electrode 33, respectively. The first electrode 33 and the second electrode 33 generate an electric field having a potential difference of up to 40 kV. The ECU 41 controls the timing and the amount of power provided by the energy storage device 49. The energy storage device 49 may comprise at least one of an inductor and/or a capacitor.

Step 540 includes generating an electric field within a prechamber device 13 by way of the first electrode 33 and the second electrode 33. The first electrode 33 and the second electrode 33 of the at least two electrodes 33 inside the prechamber body 31 generate an electric field in order to promote combustion inside the prechamber body 31 by way of the "ionic wind" effect. The ionic wind effect involves inducing electrostatic forces to encourage fluidic flow of charged particles, and aids in the combustion reaction by encouraging proper directional flow of charged fuel particles during the combustion process. As a result of the particle flow, air and fuel reactants are thoroughly mixed and electrically encouraged to flow towards the combustion chamber 19, thereby promoting a more efficient and complete combustion process.

Step 550 includes generating an ignition arc with a spark plug 25, thereby initiating a combustion reaction. The spark plug 25 extends from the prechamber body 31 and through the prechamber head 29, where the portion of the spark plug 25 that generates an ignition arc is disposed within the prechamber body 31 to ignite the present air-fuel mixture. Accordingly, the ECU 41 controls the timing of the spark plug 25 generating an ignition arc.

Finally, Step 560 includes at least partially containing the combustion reaction with the prechamber body 31. Air-fuel mixture present in the prechamber body 31 is subject to the ionic wind effect caused by the electric field generated by the first electrode 33 and the second electrode 33, and the spark plug 25 generates an ignition arc in order to combust the air-fuel mixture. The combusted air-fuel mixture is ejected through the plurality of orifices 32 disposed at the second end 36 of the prechamber body 31 and enter the combustion chamber 19 in the form of turbulent jets. The turbulent jets provide distributed ignition sites that enable increased burn rates of the air-fuel mixture in the combustion chamber 19. Specifically, the turbulent jets cause the air-fuel mixture in the combustion chamber 19 to ignite, and due to the geometry of the plurality of orifices 32 of the prechamber body 31, the ignition of the remaining air-fuel mixture occurs in an even distribution.

Although only a few example embodiments have been described in detail above, those skilled in the art will readily appreciate that many modifications are possible in the example embodiments without materially departing from this invention. In addition, many modifications will be appreciated by those skilled in the art to adapt a particular component, situation, or material to embodiments of the disclosure without departing from the essential scope thereof. Accordingly, all such modifications are intended to be included within the scope of this disclosure as defined in the following claims. Furthermore, the compositions described herein may be free of any component, or composition not expressly recited or disclosed herein. Any method may lack any step not recited or disclosed herein. Likewise, the term “comprising” is considered synonymous with the term “including.” Whenever a method, composition, element, or group of elements is preceded with the transitional phrase “comprising,” it is understood that we also contemplate the same composition or group of elements with transitional phrases “consisting essentially of,” “consisting of,” “selected from the group consisting of,” or “is” preceding the recitation of the composition, element, or elements and vice versa.

Unless otherwise indicated, all numbers expressing quantities used in the present specification and associated claims are to be understood as being modified in all instances by the term “about.” Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. A prechamber device comprising:

a prechamber body comprising a plurality of orifices, the prechamber body being configured to at least partially contain a combustion reaction;

a first electrode and a second electrode configured to generate an electric field within the prechamber device;

an insulation configured to insulate the first electrode and the second electrode from the prechamber body;

a first electrode terminal configured to receive a first amount of power from an energy storage device and deliver the first amount of power to the first electrode, and a second electrode terminal configured to receive a second amount of power from the energy storage device, and deliver the second amount of power to the second electrode;

a spark plug configured to generate an ignition arc thereby initiating the combustion reaction, and a prechamber head configured to retain a position of the spark plug and close off a first end of the prechamber body.

2. The prechamber device of claim 1, wherein the prechamber body is configured to receive an air-fuel mixture.

3. The prechamber device of claim 1, wherein the first electrode and the second electrode comprise a pin, a plate, or a cylinder type electrode.

4. The prechamber device of claim 1, wherein the energy storage device comprises at least one of a capacitor or an inductor.

5. The prechamber device of claim 1, wherein the prechamber device is configured such that the spark plug extends through the prechamber head.

6. The prechamber device of claim 1, wherein the first electrode terminal and the second electrode terminal each extend from an associated electrode and through the prechamber head.

7. The prechamber device of claim 1, wherein the first electrode and the second electrode generate the electric field with a potential difference that is less than or equal to 40 kilovolts (kV).

8. The prechamber device of claim 7, wherein the second end of the prechamber body is disposed at an end of the prechamber body extending away from the prechamber head.

9. An engine comprising:

a combustion chamber configured to form a containment boundary for a combustion reaction;

a piston actuated by the combustion reaction;

a fuel injector configured to inject fuel into the combustion chamber;

a prechamber device comprising:

a prechamber body comprising a plurality of orifices, the prechamber body being configured to at least partially contain the combustion reaction;

a first electrode and a second electrode configured to generate an electric field within the prechamber device;

an insulation configured to insulate the first electrode and the second electrode from the prechamber body;

a first electrode terminal configured to receive a first amount of power from an energy storage device and deliver the first amount of power to the first electrode, and a second electrode terminal configured to receive a second amount of power from the energy storage device, and deliver the second amount of power to the second electrode;

a spark plug configured to generate an ignition arc thereby initiating the combustion reaction, and a prechamber head configured to retain a position of the spark plug and close off a first end of the prechamber body, and an electronic control unit (ECU) configured to control a strength and timing of the electric field between the first electrode and the second electrode.

10. The engine of claim 9, wherein the prechamber body extends into the combustion chamber.

11. The engine of claim 10, wherein the energy storage device comprises at least one of a capacitor or an inductor.

12. The engine of claim 9, wherein the ECU comprises a memory and a central processing unit (CPU).

13. The engine of claim 9, wherein the prechamber device is attached to a cylinder head.

14. The engine of claim 9, wherein the prechamber device is configured such that the spark plug extends through the prechamber head.

15. The engine of claim 9, wherein the prechamber body is configured to receive an air-fuel mixture.

16. The engine of claim 9, wherein the combustion chamber comprises an intake valve and an exhaust valve.

17. A method comprising:

retaining a position of a spark plug with a prechamber head, where the prechamber head closes off a first end of a prechamber body comprising a plurality of orifices;

insulating a first electrode and a second electrode from the prechamber body with an insulation;

receiving a first amount of power from an energy storage device with a first electrode terminal, and delivering the first amount of power to the first electrode;

receiving a second amount of power from the energy storage device with a second electrode terminal, and delivering the second amount of power to the second electrode;

generating an electric field within a prechamber device comprising the prechamber head and the prechamber body by way of the first electrode and the second electrode;

generating an ignition arc with the spark plug thereby initiating a combustion reaction;

containing the combustion reaction at least partially in the prechamber body.

18. The method of claim 17, further comprising: receiving an air-fuel mixture within the prechamber body.

19. The method of claim 17, further comprising: positioning the spark plug within the prechamber device such that the spark plug extends through the prechamber head.

20. The method of claim 17, further comprising: extending a first electrode terminal and a second electrode terminal from an associated electrode through the prechamber head.

* * * * *